(12) United States Patent
Spoeler

(10) Patent No.: US 6,983,838 B2
(45) Date of Patent: Jan. 10, 2006

(54) MODULAR CONSTRUCTION SYSTEM FOR A CONVEYOR FOR CONVEYING ARTICLE CARRIERS LONGITUDINALLY OR TRANSVERSELY

(75) Inventor: Hans-Gerd Spoeler, Borken (DE)

(73) Assignee: Siemens Aktiengesellschaft, (DE)

( * ) Notice: Subject to any disclaimer, the term of this patent is extended or adjusted under 35 U.S.C. 154(b) by 0 days.

(21) Appl. No.: 10/843,817

(22) Filed: May 12, 2004

(65) Prior Publication Data

US 2004/0251115 A1    Dec. 16, 2004

(30) Foreign Application Priority Data

May 14, 2003  (DE)  ................ 103 21 736

(51) Int. Cl.
*B65G 35/00* (2006.01)
(52) U.S. Cl. ............... 198/615; 198/817; 198/465.3; 198/803.2; 198/860.2; 198/861.1
(58) Field of Classification Search ............... 198/615, 198/817, 465.3, 803.2, 860.2, 861.1
See application file for complete search history.

(56) References Cited

U.S. PATENT DOCUMENTS

| | | | | |
|---|---|---|---|---|
| 4,399,908 A | * | 8/1983 | Gunti ............... | 198/860.2 |
| 4,930,623 A | * | 6/1990 | Johnson et al. ........ | 198/861.1 |
| 2003/0000812 A1 | | 1/2003 | McTaggart et al. ..... | 198/860.1 |

FOREIGN PATENT DOCUMENTS

| | | |
|---|---|---|
| DE | 25 15 022 A1 | 3/1976 |
| DE | 28 15 351 A1 | 10/1978 |
| DE | 36 23 202 C1 | 11/1987 |
| DE | 39 22 397 C2 | 1/1991 |
| DE | 196 37 353 C2 | 3/1998 |
| DE | 199 39 197 A1 | 2/2001 |
| DE | 100 01 703 A1 | 7/2001 |
| EP | 0 409 381 A1 | 1/1991 |

* cited by examiner

Primary Examiner—Joe Dillon, Jr.
(74) Attorney, Agent, or Firm—Van Dyke, Gardner, Linn & Burkhart, LLP

(57) ABSTRACT

The invention relates to a modular construction system for a conveyor for conveying article carriers longitudinally or transversely, having lateral longitudinal carriers, having transverse frame elements which connect these longitudinal carriers, and having driven load-bearing conveying means for the article carriers. The object of the present invention is to provide a modular construction system which is significantly improved in relation to prior-art solutions in respect of production costs, assembly and installation costs, process costs and the delivery time for the conveyor. In order to achieve the object, it is proposed that the longitudinal carrier, which accommodates the conveying means, is a respective torsionally rigid hollow aluminum or plastic profile which can be connected in a releasable manner to the transverse frame element and is designed for optionally accommodating driven load-bearing rollers or insertable sliding plates for a load-bearing belt.

24 Claims, 8 Drawing Sheets

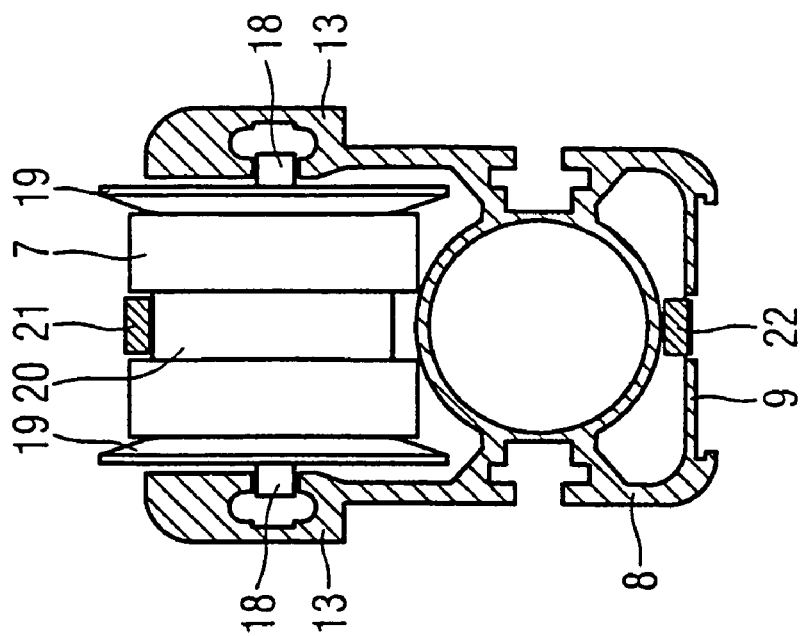
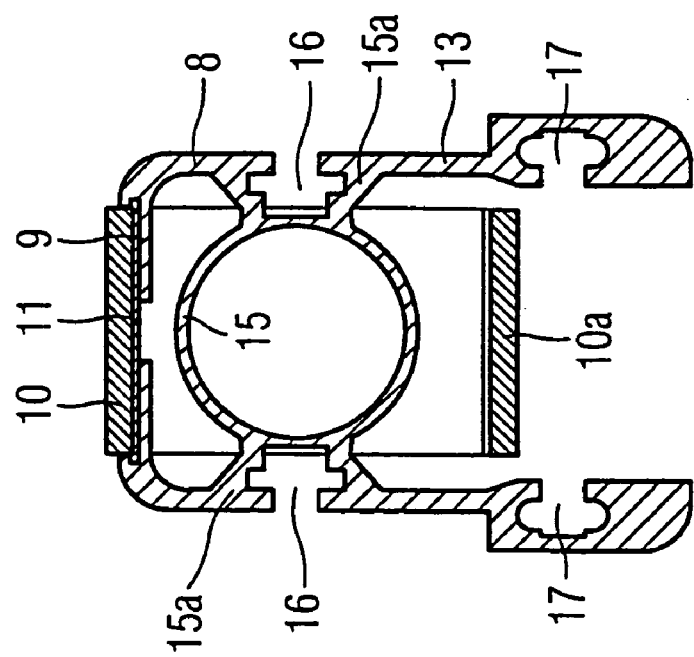

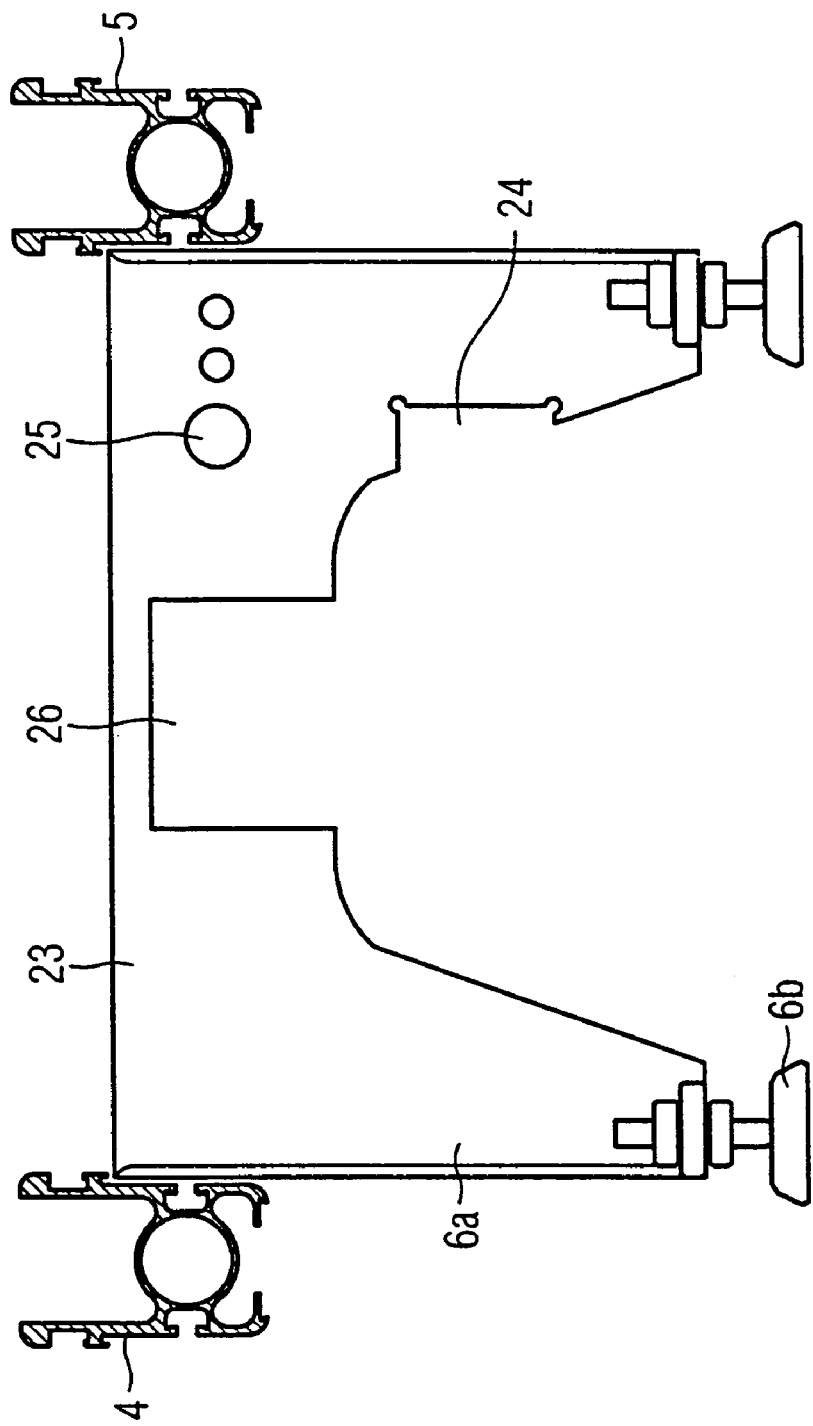

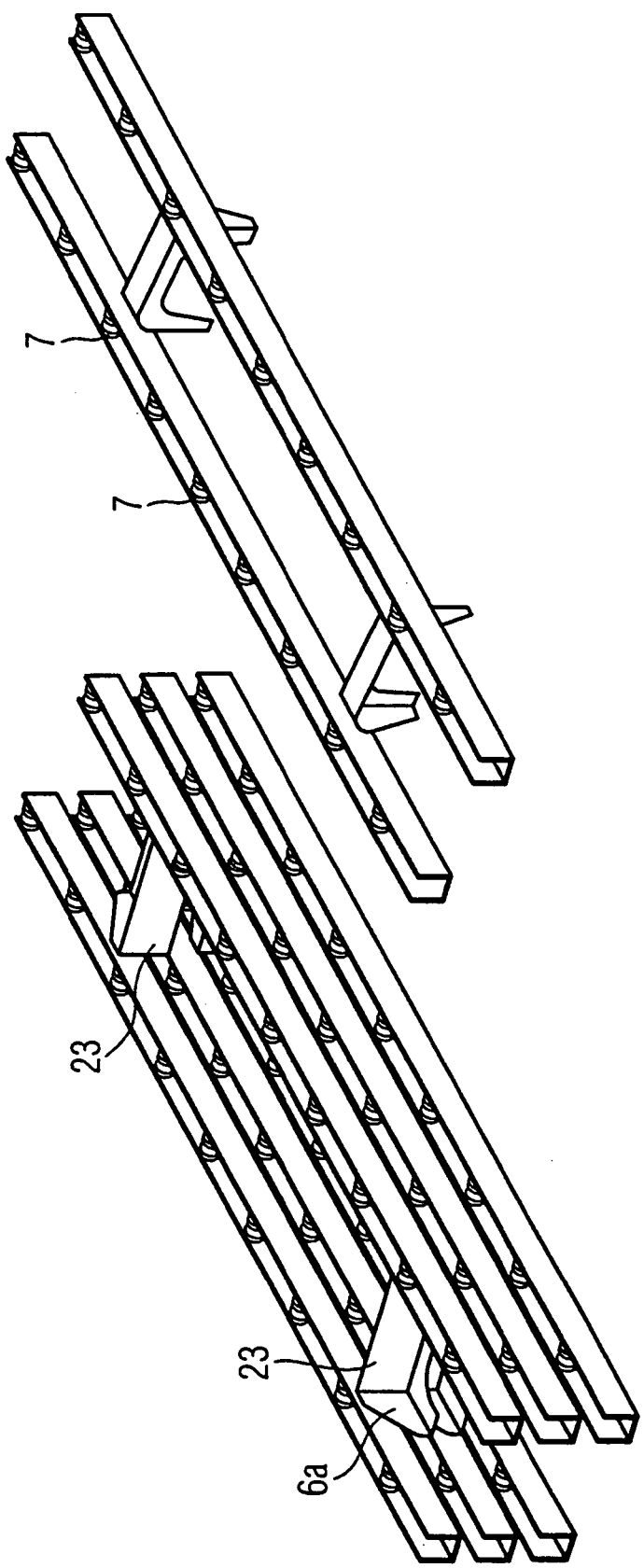

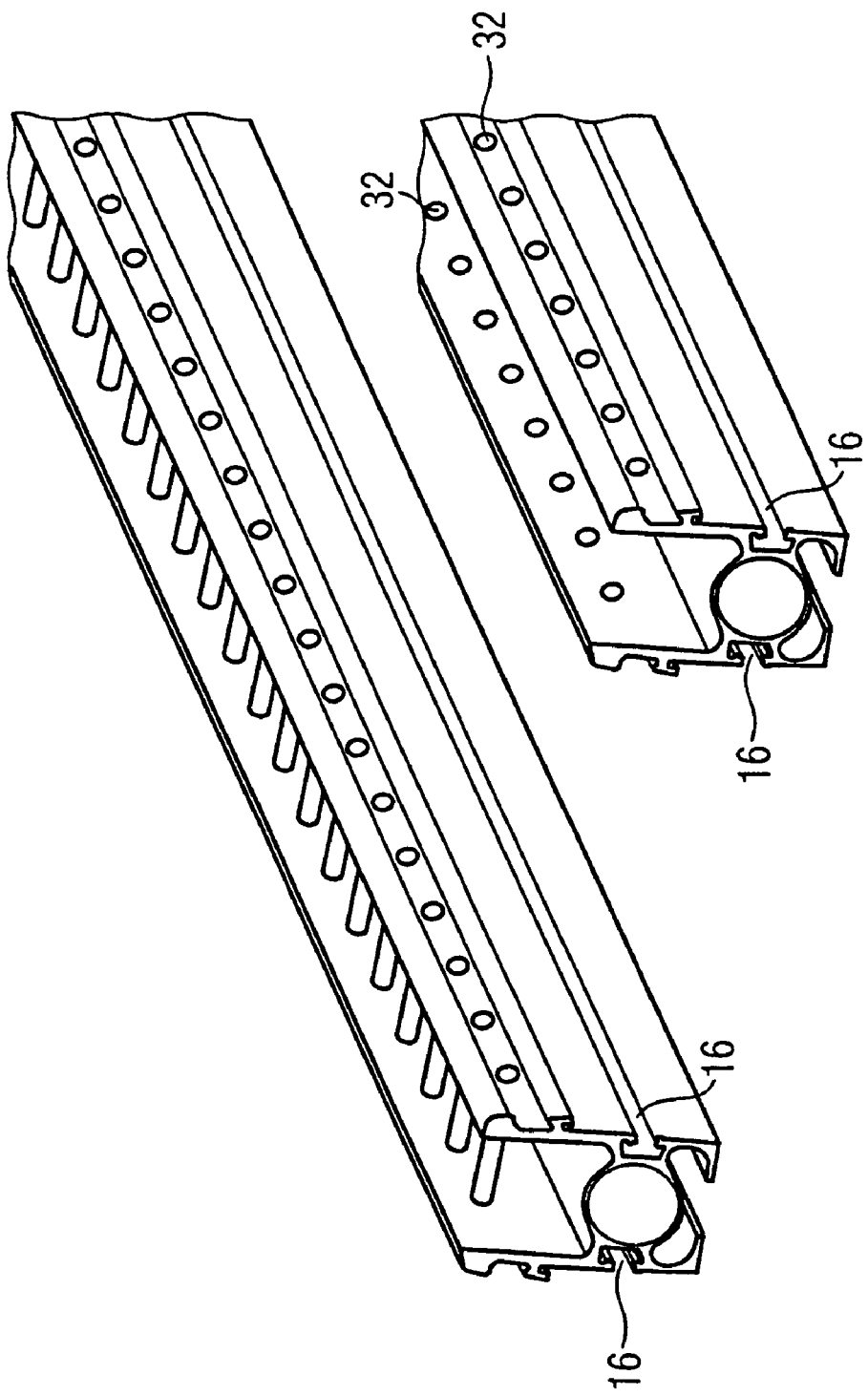

MODULAR CONSTRUCTION SYSTEM FOR A CONVEYOR FOR CONVEYING ARTICLE CARRIERS LONGITUDINALLY OR TRANSVERSELY

FIELD OF THE INVENTION

The invention relates to a modular construction system for a conveyor for conveying article carriers, such as pallets, skids or the like, longitudinally or transversely.

BACKGROUND OF THE INVENTION

Different systems are known for conveying article carriers; a distinction can be drawn essentially between the load carriers being borne with rolling action on roller conveyors and being borne with sliding action, in which case the load carrier rests on load-bearing elements which are borne with sliding action on an underlying surface. The load carriers which are used for bearing with sliding action can be broadly divided into load-bearing belts and chains. Load-bearing-belt or chain conveyors are particularly suitable in order to allow so-called transverse transportation of pallets, this often being necessary and being unsuitable for the roller conveyor on account of the roller spacing which has to be bridged.

The production of conveyors of the above-described type involves considerable outlay since, in practice, the two conveying principles have to be made available alongside one another, which means a very large range of components, with corresponding storage and keeping replacement parts in stock, and which thus, ultimately, renders the conveyor significantly more expensive. Individual customer-specific solutions and special designs become more expensive basically as a result of high production and design costs, and long delivery times are also disadvantageous for the customer.

SUMMARY OF THE INVENTION

The present invention relates to a modular construction system for a conveyor for conveying article carriers, such as pallets, skids or the like, longitudinally or transversely, having lateral longitudinal carriers, having transverse frame elements which connect the longitudinal carriers and have supporting feet, and having driven load-bearing conveying means for the article carriers.

An object of the present invention is thus to provide a simplifying modular construction system which is intended for a conveyor of the type described in the introduction and which is significantly improved in relation to prior-art solutions in respect of production costs, assembly and installation costs, process costs and the delivery time for the conveyor.

In order to achieve the object, it is proposed according to the invention that, in the case of a conveyor of the generic type, the longitudinal carrier, which accommodates the conveying means, is a respective torsionally rigid hollow aluminum or plastic profile which can be connected in a releasable manner to the transverse frame element and is designed for optionally accommodating driven load-bearing rollers or insertable sliding plates for a load-bearing belt. The core of the present invention is the torsionally rigid hollow aluminum or plastic profile, which is configured both for load-bearing rollers and for load-bearing belts. It is thus possible to use one and the same longitudinal carrier of the conveyor to implement both conveying principles, namely for conveying article carriers both longitudinally and transversely. The universally usable longitudinal carriers are adapted to the respectively desired purpose merely by using either load-bearing rollers or by inserting sliding plates, and are screwed onto the transverse frame elements. The conveyor may thus be put together like a modular construction, the number of components used is reduced to a minimum, and the conveyor is very easy to assemble.

In an advantageous configuration of the invention, it is provided that the hollow aluminum or plastic profile is open on one of its longitudinal sides for the purpose of accommodating the load-bearing rollers and is largely closed on the opposite side in order to form a rest for the sliding plate, and that, by virtue of the hollow aluminum or plastic profile being rotated through 180° about its longitudinal axis, the side which is required for the necessary purpose in each case can be connected to the transverse frame element in the use position.

The hollow aluminum or plastic profile is preferably formed cross-sectionally, on two opposite longitudinal sides, such that it can accommodate the load-bearing rollers on one longitudinal side and can support the sliding plates for a load-bearing belt on the opposite side. By virtue of the hollow aluminum or plastic profile simply being rotated through 180° about its longitudinal axis and being screwed onto the transverse frame elements, it is easily possible to use one and the same hollow aluminum or plastic profile to form a roller conveyor or a load-bearing-belt conveyor; there is no need for any special, different profiles.

It is advantageously provided that the hollow aluminum or plastic profile is of H-shaped design in cross section, the load-bearing rollers being mounted between the two legs of the H-shaped cross section and the opposite legs of the H-shaped cross section being closed in their end region by a transverse partition which forms the rest for the sliding plate, the hollow aluminum or plastic profile being of symmetrical design. The symmetrical design is expediently necessary in order to make it easier for the hollow aluminum or plastic profile to be fastened on the longitudinal carriers. It is thus possible to provide standard fastening points for the two conveying principles, these fastening points allowing the profile to be rotated about its longitudinal axis and fastened.

The H-shaped cross section is particularly well-suited for mounting the load-bearing rollers between the two legs of this H-profile. A transverse partition between the legs of the H-profile on the opposite side provides an advantageous rest for the sliding plate, on which the load-bearing belt rests and/or is borne. At the same time, a high strength in the transverse direction is achieved by the profile cross section, it being possible for this strength to be additionally enhanced if, according to a further feature of the invention, the region between the transverse partition and the crosspiece of the cross-sectionally H-shaped hollow aluminum or plastic profile contains an additional transverse reinforcement.

According to an advantageous feature of the invention, the transverse reinforcement can also be formed by a tube profile which runs in the longitudinal direction of the hollow aluminum or plastic profile and against which the insides of the legs of the aluminum profile are supported. As is known, tube profiles have a high level of stability in the transverse direction; if such a tube profile is incorporated in the hollow aluminum or plastic profile, this results in a high level of stability for the envisaged purpose, along with a low weight of the aluminum or plastic material.

It is particularly advantageous if the hollow aluminum or plastic profile and the transverse reinforcements thereof are formed from a highly precise extruded profile. Hollow aluminum or plastic profiles can be produced with a very precise shape by extrusion, there being virtually no restrictions on the shaping. The present invention makes use of this fact.

In order for it to be possible for the hollow aluminum or plastic profiles to be connected to the transverse frame element, it is provided, according to a further feature of the invention, that at least the transversely reinforced, mutually opposite side regions of the hollow aluminum or plastic profile contain T-grooves for fastening means. It is, of course, also possible for these T-grooves to be used for other components which can be fastened on the conveyor, e.g. initiators or sensors.

It is regarded as being particularly advantageous if, according to the invention, the hollow aluminum or plastic profile can be installed in prefabricated form as a roller bar with the load-bearing rollers inserted. This very much simplifies the assembly of the conveyor, even on site, and the roller bars can be prepared in accordance with the use purpose and connected quickly and straightforwardly, as required, to the transverse frame element.

In one configuration of the invention, it is provided that the roller bar can be closed in the region of the load-bearing rollers by a covering plate which is provided with cutouts through which segments of the load-bearing rollers can penetrate. This plate ensures that the regions between the rollers are protected, for example from being interfered with in an unintended manner or against any objects falling in.

According to a further feature of the invention, the load-bearing rollers of the roller bar may be formed from a cut-to-length extruded aluminum profile which is of tubular design and into which hubs for accommodating the bearing means of the load-bearing rollers can be pressed on both sides. The production of the load-bearing rollers is simplified to a considerable extent by this proposal. Rollers of the necessary roller width are cut off from the tubular extruded profile. The hubs are pressed into the tube on the right and left and form the fixed bearing for the spindles of the rollers. At the same time, one feature of the invention provides for flanges for guiding the article carriers to be integrally formed on the hubs.

In order to drive the load-bearing rollers, it is conceivable for the load-bearing rollers to be provided with a groove all the way around the center or, protected by the top belt of the extruded aluminum profile, in a laterally offset manner, it being possible for a transmission belt which is common to all the load-bearing rollers of a roller bar to be inserted into this groove. This transmission belt is preferably a toothed belt, and the load-bearing rollers are provided with a correspondingly toothed circumferential surface in the bearing region of the transmission belt. This makes it possible for a high driving torque to be transmitted.

According to another configuration of the invention, however, it is also conceivable for all the load-bearing rollers of a roller bar to have a transporting belt circulating around them, the transporting belt, resting on the load-bearing rollers, conveying the article carrier. This solution is particularly suitable for transporting pallets transversely if the use of load-bearing belts which bear loads with sliding action, on account of high loads, is not possible.

According to another feature of the invention, the transverse frame elements, onto which the longitudinal carriers can be screwed, are formed from an angled metal plate which has integrally formed supporting legs. This provides an element which is very easy and inexpensive to produce, can likewise be screwed in modular fashion to the longitudinal carriers and can be delivered in prefabricated form with the conveyor. According to a further feature of the invention, height-adjustable supporting feet are introduced into the supporting legs of the transverse frame elements on the floor side, it being possible for the supporting feet to be used to align the conveyor on the floor.

The transverse frame elements according to the invention are provided, in the conveying direction of the article carriers, with cutouts into which it is possible to insert cable ducts which run along the conveyor. These cable ducts can also be inserted in modular fashion into the transverse frame elements and comprise prefabricated parts. The operation of laying the cable is simplified by accessibility being made easier.

Furthermore, provision may be made for mounts for control boxes to be integrally formed on the transverse frame elements, these boxes being fixed there and wired up with the drive of the conveyors.

A particularly advantageous solution for facilitating transportation and for reducing the transporting volume provides that the transverse frame elements of the preferably short conveyor sections can be pivoted through 90°, about in each case one of the fastening screws, into the longitudinal plane of the hollow aluminum or plastic profiles on both sides and, once they have been pivoted back and the hollow aluminum or plastic profiles have been screwed firmly to the transverse frame elements by at least one further fastening screw, they can be secured in the operating position. The supporting legs of the transverse frame elements can be swung up for transportation purposes such that the overall height of the conveyors is limited, in practice, to the height of the hollow aluminum or plastic profiles. Without any great installation outlay, it is possible for the supporting legs of the transverse frame elements to be pivoted through 90°, in relation to the conveyor, into the operating position, where they are fixed straightforwardly.

The conveyor according to the invention is of modular construction, each conveyor comprising at least two hollow aluminum or plastic profiles with sliding plates or roller bars, at least one transverse frame element, at least one drive module, and at least two transporting or transmission belts. It is clear from this that the novel conveyor requires only an extremely small number of components, of which the essential components are modular-construction parts which can be used universally for different conveying principles. All the components can be prefabricated in the workshop and assembled to form a conveyor which can then be transferred, in the state in which it is virtually ready for use, to its use location and straightforwardly constructed there. This results in very short assembly times, production is significantly simplified and transportation is rendered less expensive. All these measures combine to produce a very cost-effective conveyor.

The drive provided for the conveying means, according to one feature of the invention, is an integral drive, i.e. a direct drive of the transporting or transmission belts. This integral drive is preferably a drum motor which is installed on the final roller of the conveyor.

In order for the transporting or transmission belt of the conveyor to be kept constantly tensioned, this being necessary in order for the required driving torque to be transmitted, provision is made, according to an advantageous feature of the invention, for a deflecting roller for the transporting or transmission belt to be arranged at the end of the hollow aluminum or plastic profile, beneath the transporting plane, and, by virtue of being pivoted or displaced in the conveying direction, for this to be used for tensioning the transporting or transmission belt.

Finally, it is provided according to the invention that the roller bars of the hollow aluminum or plastic profiles are prefabricated with load-bearing rollers which, depending on the different use purposes, are positioned with different distances between their centers. For example, for conveying skids, a different (larger) distance between the centers of the load-bearing rollers is required than is customary for conveying pallets longitudinally. Correspondingly prefabricated bars are screwed, as required, onto the transverse frame elements.

To summarize, the invention has a number of advantages. It replaces the hitherto conventional rollers or shafts by a load-bearing-roller bar, which really makes the novel modular construction system possible for the first time. The essential constituent part of this system is the hollow aluminum or plastic profile, which is preferably produced by extrusion. This profile is configured such that rotating through 180° brings optionally supporting surfaces or rollers into play, and the transverse frame elements are produced functionally in a straightforward and inexpensive manner and are easy to install and swing away during transportation in order to save transporting space. The straightforward modular construction system produces an inexpensive and cost-effective conveyor, which also gives rise to considerable advantages, namely price-related advantages and technical advantages, for the operator. Thus, the conveyor according to the invention makes it possible, for example, for a load-bearing belt and roller bar to be changed over quickly without the entire conveyor being dismantled.

These and other objects, advantages, purposes and features of the present invention will become apparent upon review of the following specification in conjunction with the drawings.

BRIEF DESCRIPTION OF THE DRAWINGS

An exemplary embodiment of the invention is described hereinbelow and is illustrated in the drawings, in which:

FIG. 4 shows the hollow aluminum profile reinforced by a longitudinally running tube-profile cross section;

FIG. 5 shows the hollow aluminum profile according to FIG. 4, rotated through 180°, with load-bearing rollers and a transmission belt;

FIG. 6 shows a cross section through the conveyor according to the invention;

FIG. 8a shows the conveyor in the transporting position;

FIG. 8b shows the conveyor in the operating position;

FIG. 10 shows the prefabricated hollow aluminum or plastic profile with the bearing means for the spindles of the load-bearing rollers.

DESCRIPTION OF THE PREFERRED EMBODIMENTS

Figure 1:
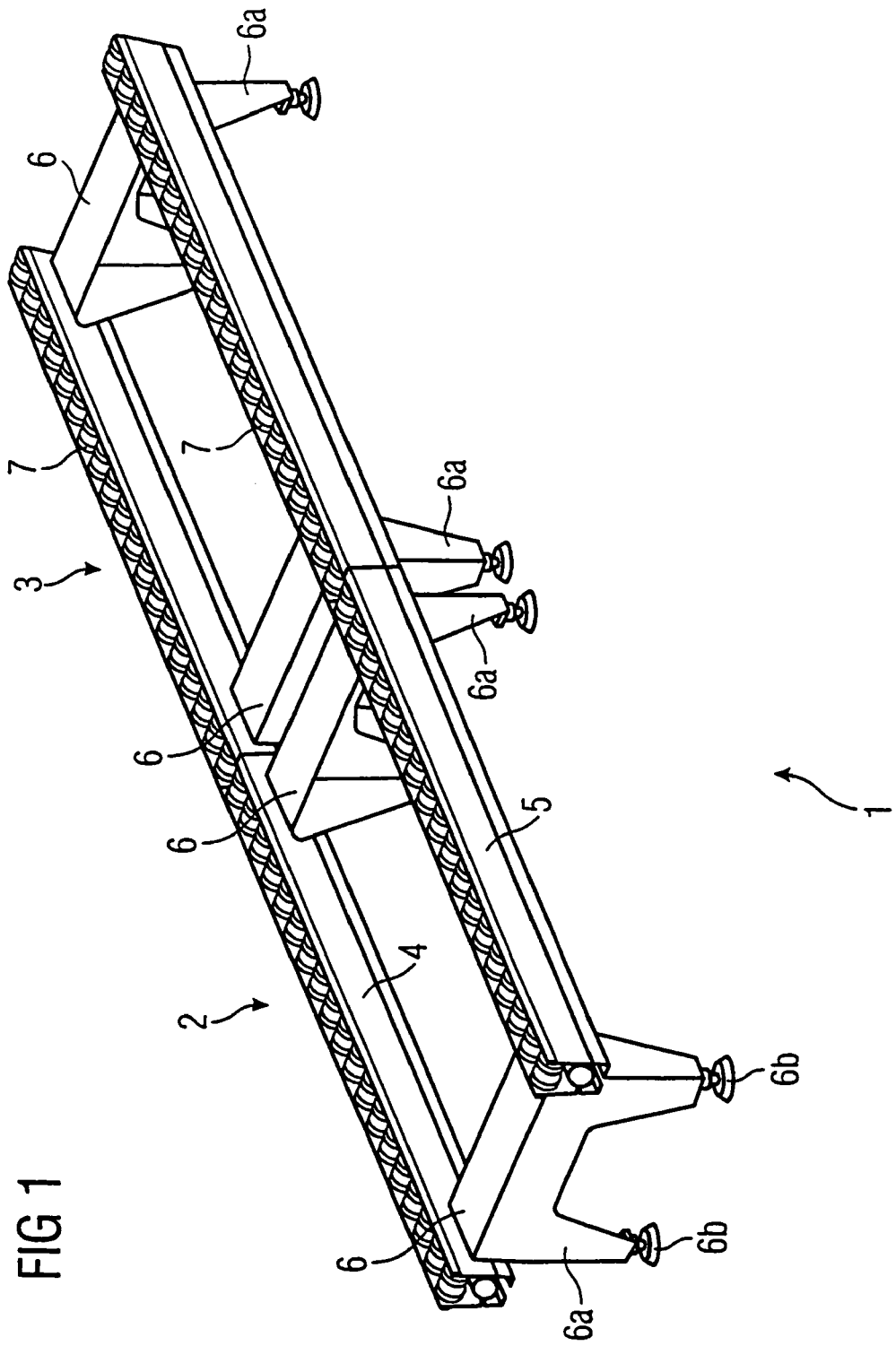
FIG. 1 shows a perspective view of the conveyor according to the invention produced by the modular construction system.

A conveyor which is made up of two conveyor sections 2 and 3 from the modular construction system according to the invention is designated 1 overall in FIG. 1. This modular construction system or the conveyor essentially comprises the longitudinal carriers, which in the exemplary embodiment are designed as hollow aluminum profiles 4 and 5. These hollow aluminum profiles 4 and 5 are screwed laterally on transverse frame elements 6 comprising angled sheet-metal parts. The transverse frame elements have integrally formed legs 6a, on which height-adjustable feet 6b are arranged.

Load-bearing rollers 7 are mounted in the hollow aluminum profiles 4 and 5 with small distances between their centers, as will be described in more detail at a later stage in the text. All the components described in conjunction with FIG. 1 are connected to one another in an easily releasable manner and be exchanged in modular fashion. It is thus possible, for example, for the transverse frame elements to be exchanged for other transverse frame elements of a different width if a greater conveyor width is desired. The hollow aluminum profiles 4 and 5 can be exchanged for ones which have different distances between the centers of the load-bearing rollers, or are rotated in the manner according to the invention in order to bear load-bearing belts with sliding action.

Figure 2:
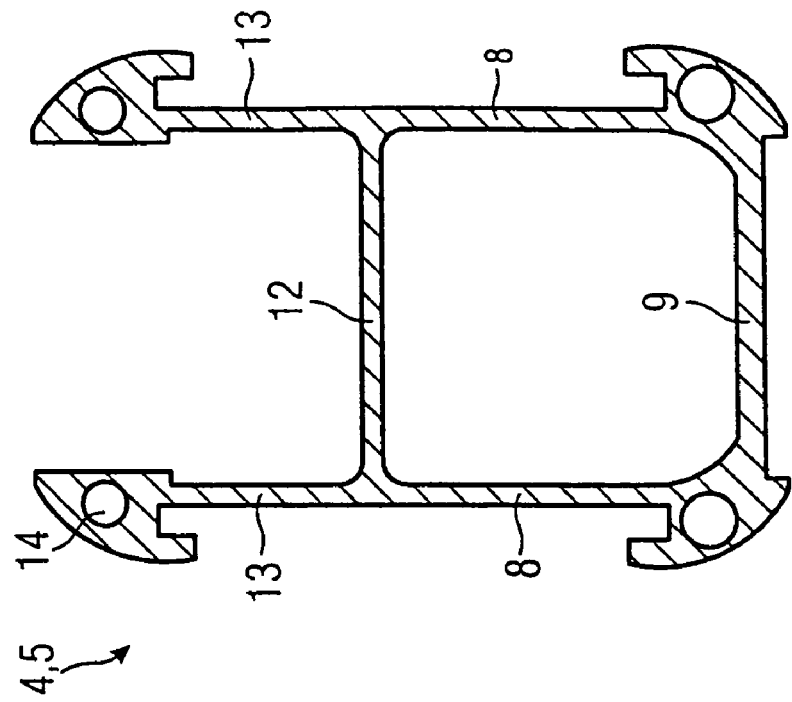
FIG. 2 shows a cross section through the hollow aluminum or plastic profile according to the invention with a load-bearing belt which bears loads with sliding action.
Figure 3:
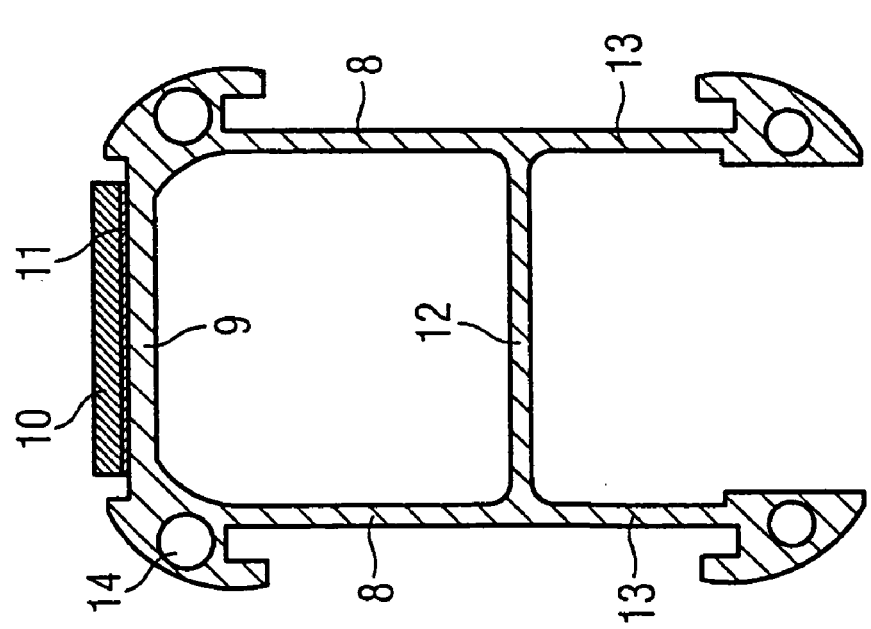
FIG. 3 shows a cross section through the hollow aluminum or plastic profile according to the invention which has been rotated through 180° in relation to FIG. 3.

The last-described possibility can best be seen in FIG. 2. The latter illustrates a cross section through a hollow aluminum profile 4, 5 of the invention. It can be seen that the profile is of essentially H-shaped design, the top legs 8, which form the large H, being connected to one another in their end regions by a transverse partition 9 on which the load-bearing belt, which is indicated at 10, is supported with the interposition of a sliding plate 11. The legs 13, which extend on the other side of the crosspiece 12 of the H-shaped hollow aluminum profile, are not closed in the outward direction, the load-bearing rollers being inserted between them, as will be explained at a later stage in the text. For this purpose, the hollow aluminum profile is rotated through 180°, as is illustrated in FIG. 3. The same parts are provided with the same designations therein. FIGS. 2 and 3 designates bores which extend along the hollow aluminum profile and in which it is possible to introduce fastening or centering elements for joining together adjacent conveyors.

As can be seen in FIG. 4, the cross section of the hollow aluminum profile may be configured in a variety of different ways. FIG. 4 shows, for the purpose of reinforcing the hollow aluminum profile, a longitudinally running tube-profile cross section 15, against which the side walls 8 and 13 of the H-shaped cross section are supported via ribs 15a. In the region to the sides of the tube cross section 15, the side walls 8 and 13 contain fastening grooves 16, by means of which the hollow aluminum profiles can be screwed on the transverse frame elements, preferably with the aid of hammer head screws. The top region of FIG. 4 shows a load-bearing belt in cross section at 10, it being possible for the bottom strand of this belt to be returned within the hollow aluminum profile, as indicated at 10a. Between the load-bearing belt 10 and the transverse partition 9, it is possible to see the sliding plate 11, on which the load-bearing belt slides. In the bottom region of the legs 13 of the H-profile, it is possible to see accommodating grooves 17, in which spindles of the load-bearing rollers can be mounted on both sides.

The mounting of the load-bearing rollers 7 can better be seen in FIG. 5, where it is also possible to see the ends of the spindle 18 for mounting the load-bearing rollers. The hollow aluminum profile illustrated in FIG. 4 has obviously been rotated through 180° about its longitudinal axis, with the result that the tubular transverse reinforcement is now located beneath the load-bearing roller, which is mounted between the legs 13. The load-bearing roller 7 is provided on both sides with flanges 19 for guiding article carriers, the load-bearing roller 7 itself being provided centrally with a circumferential groove 20 in which is guided a transmission belt 21, by means of which the load-bearing rollers can be driven via the drive (not illustrated here). The bottom strand of the transmission belt 21 is returned at 22, where the transverse partition 9 has a through-passage opening for the transmission belt 21.

FIG. 6 shows a schematic cross section of the arrangement of the two hollow aluminum profiles 4 and 5 on the transverse frame element 23, which is formed from an angled metal plate. The transverse frame element 23, in alignment with adjacent transverse frame elements 23 (as seen in the direction perpendicular to the plane of the drawing), has cutouts 24 in the metal plate, into which a cable duct can be inserted, and also apertures 25 for installations, mounts for switchboxes 26, and height-adjustable supporting feet 6b on the legs 6a. The hollow aluminum profiles 4 and 5 are screwed onto the angled sheet-metal parts of the transverse frame element 23 (in a manner which is not illustrated). The hollow aluminum profiles 4 and 5 are symmetrical and can be attached on both sides and also in a state in which they have been rotated through 180°.

Figure 7C:
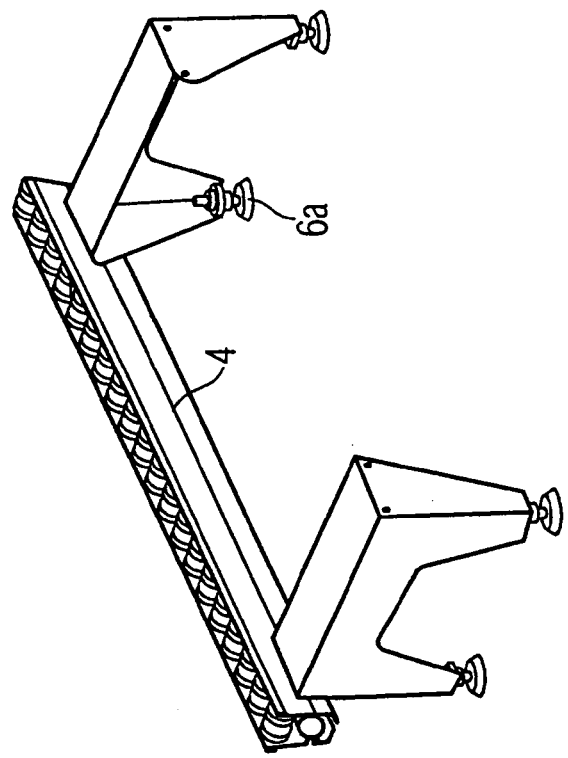
FIGS. 7a–c show perspective views of the transverse frame parts according to the invention.
Figure 7A:
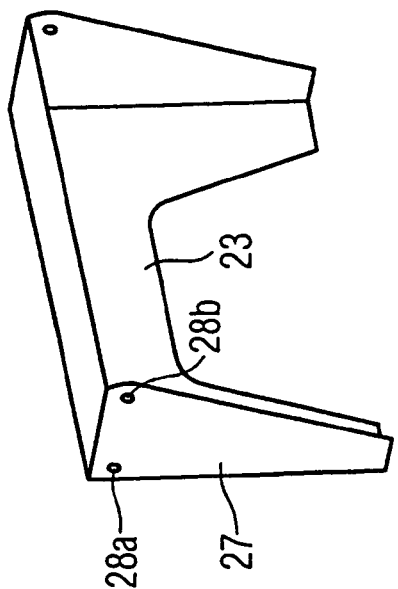
Figure 7B:
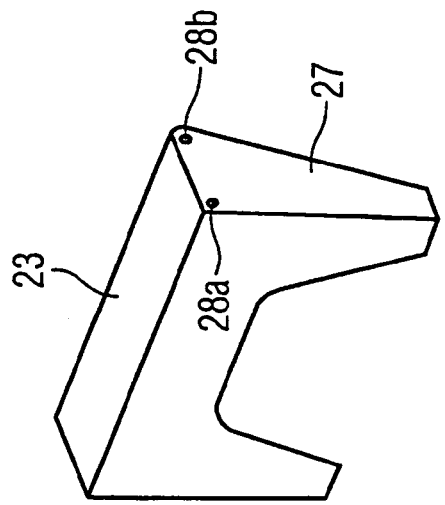

FIGS. 7a–7c show a perspective view of the transverse frame parts according to the invention. As has already been explained, the transverse frame elements 22 comprise angled sheet-metal parts which form abutment surfaces for the hollow aluminum profiles 4, 5 laterally at 27 and are provided there with bores 28a and 28b for the fastening screws of these hollow aluminum profiles. Use is advantageously made for this purpose of hammer head screws, which are inserted in the longitudinally running T-grooves 16 of the hollow aluminum profiles. The conveyor is aligned via the supporting feet 6b.

Using two adjacent bores 28a and 28b allows the conveyor to be transported in a space-saving manner if, as the invention proposes, the transverse frame elements 23 are swung in a direction in which the supporting legs 6a are positioned parallel to the hollow aluminum profiles 4, 5. For this purpose, just one fastening screw is screwed in, for example at 28a, preferably on each side of a transverse frame element 23, and the transverse frame element 23 can be pivoted about this screw. As soon as the conveyor is to be set up, the transverse frame element 23, by virtue of being pivoted back about the two screws provided on both sides in the bores 28a, is moved into the upright, operating position, where the second screw is introduced into the bore 28b, and tightened, in order for this position to be fixed. A very stable conveyor frame is produced by virtue of both screws being fastened in the bores 28a and 28b.

FIG. 8a shows the conveyor in the transporting position, three conveyor elements being illustrated in a state in which they are stacked one above the other. The operating position of the conveyor is illustrated in FIG. 8b. A relatively large distance between the load-bearing rollers 7 can also be seen here, this indicating that this conveyor is used to transport a load carrier, for example a skid, in the longitudinal direction.

Figure 9A:
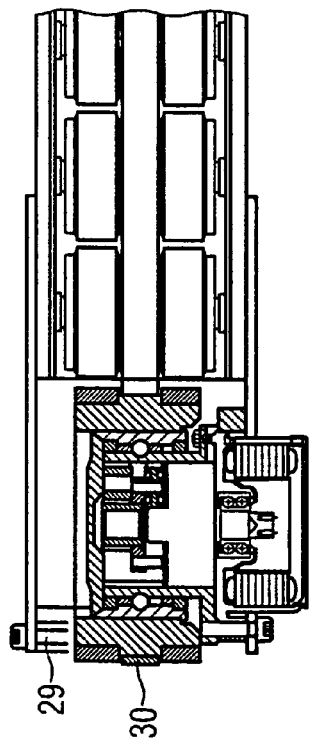
FIG. 9a shows an enlarged illustration of the integral drive as a drum motor.
Figure 9B:
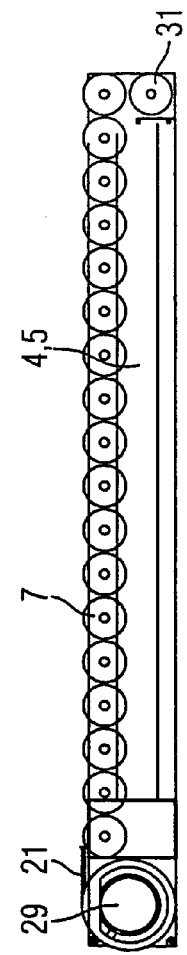
FIGS. 9b and 9c show a plan view and a side view of the hollow aluminum or plastic profile.
Figure 9C:
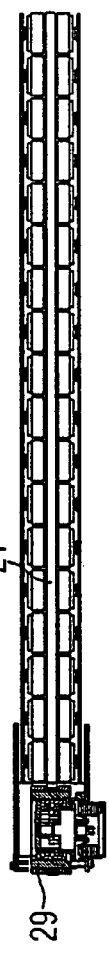

A further advantage of the invention is illustrated in FIGS. 9a–c. FIGS. 9b and 9c illustrate, in side view and in plan view in each case, merely a hollow aluminum profile 4, 5 with load-bearing rollers 7 mounted therein, these rollers all being driven, via a common transmission belt 21 designed as a toothed belt 30, by an integral drive 29. The latter is designed as a drum motor (FIG. 9a), around which the toothed belt 30 is guided in order to transmit the driving torque. At the opposite end of the roller bar, which is formed from the load-bearing rollers 7 and the hollow aluminum profile 4, 5, a deflecting roller 31 is provided in a pivotable or displaceable manner beneath the load-bearing plane, it being possible for the transmission belt 21 to be tensioned with the aid of said deflecting roller.

FIG. 10, finally, illustrates, once again, an H-shaped hollow aluminum-profile section according to the invention in three-dimensional form. The prepared bores 32, which later accommodate the spindles of the load-bearing rollers 7, can be seen in the bottom illustration of the profile. In the top illustration, these spindles, on which the load-bearing rollers 7 rotate, are illustrated as having been plugged into the bores 32. It is also possible to see the T-grooves 16 which run along the hollow aluminum profile and are intended for fastening the hollow aluminum profiles on the transverse frame elements 23, but also for fastening add-on parts, such as initiators, switchboxes, etc.

Changes and modifications to the specifically described embodiments may be carried out without departing from the principles of the present invention, which is to be limited only by the scope of the appended claims as interpreted according to the principles of patent law.

What is claimed is:

1. A modular construction system for a conveyor for conveying article carriers including pallets or skids, longitudinally or transversely, comprising:
   lateral longitudinal carriers;
   transverse frame elements which connect the longitudinal carriers and have supporting feet; and
   driven load-bearing conveying means for the article carriers, wherein the longitudinal carrier, which accommodates the conveying means, is a respective torsionally substantially rigid hollow profile which can be connected in a releasable manner to a transverse frame element and is designed for optionally accommodating one of driven load-bearing rollers and insertable sliding plates for a load-bearing belt, the hollow profile being open on one of its longitudinal sides for the purpose of accommodating the load-bearing rollers and being at least partially closed on the opposite longitudinal side in order to form a rest for the sliding plate, and wherein, by virtue of the hollow profile being rotated through 180° about its longitudinal axis, the longitudinal side for the selected purpose in each case can be oriented in a use position relative to the transverse frame element.

2. The modulator construction system as claimed in claim 1, characterized in that the hollow profile is open on one of its longitudinal sides for the purpose of accommodating the load-bearing rollers between the legs of the hollow profile, and is at least largely closed on the opposite longitudinal side in order to form a rest for the sliding plate.

3. The modular construction system as claimed in claim 1, characterized in that the hollow profile is of H-shaped design in cross section, the load-bearing rollers being mounted between the legs of the H-shaped cross section and the opposite legs of the H-shaped cross section being closed in their end region by a transverse partition which forms the rest for the sliding plate, and in that the hollow profile is of symmetrical design.

4. The modular construction system as claimed in claim 3, characterized in that the region between the transverse partition and the crosspiece of the cross-sectionally H-shaped hollow profile contains an additional transverse reinforcement.

5. The modular construction system as claimed in claim 4, characterized in that the transverse reinforcement is formed by a tube profile which runs in the longitudinal direction of the hollow profile and against which the insides of the legs of the hollow profile are supported.

6. The modular construction system as claimed in claim 4, characterized in that the hollow profile and the transverse reinforcements thereof are formed from an extruded profile.

7. The modular construction system as claimed in claim 4, characterized in that at least the transversely reinforced, mutually opposite side regions of the hollow profile contain T-grooves for fastening means, by means of which the hollow profiles am he connected to the transverse frame element.

8. The modular construction system as claimed in claim 1, characterized in that the hollow profile can be installed in prefabricated form as a roller bar with load-bearing rollers inserted.

9. The modular construction system as claimed in claim 8, characterized in that the roller bar, in the region of the load-bearing rollers, can he closed by a covering plate which is provided with cutouts through which segments of the load-bearing rollers can penetrate.

10. The modular construction system as claimed in claim 1, characterized in that the load-bearing rollers are formal from a cut-to-length extruded profile which is of tubular design and into which hubs for accommodating the bearing means of the load-bearing rollers can be pressed on both sides, said extruded profile comprising one of aluminum and plastic.

11. The modular construction system as claimed in claim 10, characterized in that flanges for guiding the article carriers are integrally formed on the hubs of the load-bearing rollers.

12. The modular construction system as claimed in claim 1, characterized in that the load-bearing rollers are grooved all the way around the center, and a transmission belt which is common to all the load-bearing rollers of a roller bar is guided in the groove.

13. The modular construction system as claimed in claim 12, characterized in that the transmission belt is a toothed belt, and the load-bearing rollers are provided with a correspondingly toothed circumferential surface in the bearing region of the transmission belt.

14. The modular construction system as claimed in claim 1, characterized in that all the load-bearing rollers of a roller bar have a transporting belt circulating around them, the transporting belt, resting on the load-bearing rollers, conveying the article carrier.

15. The modular construction system as claimed in claim 1, characterized in that the transverse frame elements are formed from an angled metal plate which has integrally formed supporting legs and onto which the hollow profiles can be screwed on both sides.

16. The modular construction system as claimed in claim 15, characterized in that the supporting legs of the transverse frame elements are provided on the floor side with height-adjustable supporting feet.

17. The modular construction system as claimed in claim 1, characterized in that the transverse frame elements are provided, in the conveying direction of the article carriers, with cutouts, into which it is possible to insert cable ducts which run along the conveyor.

18. The modular construction system as claimed in claim 17, characterized in that mounts for control boxes are integrally formed on the transverse frame elements.

19. The modular construction system as claimed in claim 15, characterized in that the transverse frame elements are pivotable about fastening screws and into the longitudinal plane of the hollow profiles on both sides and are pivotable about the fastening screws back to an orientation where said transverse frame elements are generally transverse to the longitudinal plane of the hollow profiles, wherein when said transverse frame elements have been pivoted back, the hollow profiles are screwed firmly to the transverse frame elements by at least one further fastening screw to secure said hollow profiles to said transverse frame elements in the use position.

20. The modular construction system as claimed in claim 1, characterized in that each modular-construction conveyor comprises at least two hollow profiles with sliding plates or roller bars, at least one transverse frame element, at least one drive module, and at least two transporting or transmission belts.

21. The modular construction system as claimed in claim 20, characterized in that the drive for the conveying means is designed as an integral drive.

22. The modular construction system as claimed in claim 21, characterized in that the integral drive is a drum motor.

23. The modular construction system as claimed in claim 20, characterized in that a deflecting roller for the transporting or transmission belt is arranged at the end of the hollow profile, beneath the transporting plane, and, by virtue of being pivoted or displaced in the conveying direction, can be used for tensioning the transporting or transmission belt.

24. The modular construction system as claimed in claim 1, characterized in that the roller bars of the hollow profiles are prefabricated with load-bearing rollers which, in dependence on the different use purposes, are positioned with different distances between their centers.

\* \* \* \* \*

UNITED STATES PATENT AND TRADEMARK OFFICE
CERTIFICATE OF CORRECTION

PATENT NO. : 6,983,838 B2
APPLICATION NO. : 10/843817
DATED : January 10, 2006
INVENTOR(S) : Hans-Gerd Spoeler It is certified that error appears in the above-identified patent and that said Letters Patent is hereby corrected as shown below:

Column 8
Claim 1, Line 36, "skids," should be --skids--

Column 9
Claim 7, Line 21, "profiles am he" should be --profiles can be--
Claim 9, Line 29, "can he" should be --can be--
Claim 10, Line 33, "formal" should be --formed--

Signed and Sealed this

Twenty-fourth Day of June, 2008

JON W. DUDAS
*Director of the United States Patent and Trademark Office*